United States Patent
Gehringhoff et al.

(10) Patent No.: US 6,524,404 B2
(45) Date of Patent: Feb. 25, 2003

(54) B-COLUMN FOR MOTOR VEHICLE

(75) Inventors: Ludger Gehringhoff, Paderborn (DE); Hans-Jürgen Knaup, Bad Lippspringe (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/933,143

(22) Filed: Aug. 20, 2001

(65) Prior Publication Data

US 2002/0104591 A1 Aug. 8, 2002

(30) Foreign Application Priority Data

Aug. 19, 2000 (DE) .......................... 200 14 361

(51) Int. Cl.[7] .......................... C22C 38/00; C22C 38/18
(52) U.S. Cl. .................. 148/320; 148/330; 148/333; 148/902; 428/682
(58) Field of Search .................. 148/902, 320, 148/333, 330; 428/682, 683

(56) References Cited

U.S. PATENT DOCUMENTS 5,192,376 A    3/1993    Tanabe

FOREIGN PATENT DOCUMENTS

DE    197 43 802 A1    3/1999

OTHER PUBLICATIONS

English abstract of Belgium patent 829089A, Nov. 14, 1975.*

English abstract of Belgium patent 824961A, Jul. 29, 1975.*

* cited by examiner

Primary Examiner—Deborah Yee
(74) Attorney, Agent, or Firm—Henry M. Feiereisen

(57) ABSTRACT

A B-column comprises a component of a car body for a motor vehicle. The B-column constitutes a longitudinal steel profile. The invention provides that the longitudinal profile has a first longitudinal portion comprised of a martensitic material structure and a strength of more than 1400 N/mm² and has a second longitudinal portion of higher ductility with a predominantly ferritic-perlitic material structure and a strength of below 850 N/mm². The lower longitudinal portion is wider then the upper longitudinal portion and has an elongation at rupture which is below 25%.

7 Claims, 1 Drawing Sheet

B-COLUMN FOR MOTOR VEHICLE

CROSS-REFERENCE TO RELATED APPLICATIONS

This application claims the priority of German Patent Application Serial No. 200 14 361.1, filed Aug. 19, 2000, the subject matter of which is incorporated herein by reference.

BACKGROUND OF THE INVENTION

The invention relates to a B-column, as component of a body for a motor vehicle, comprising a longitudinal steel profile.

Car body components which contribute to the safety of motor vehicles, particularly those components of the safety cage structure, are usually provided by form components with material enhancement such as by hardening in an associated apparatus, with the material characteristics being distributed in a uniform manner over the length of the longitudinal profile.

U.S. Pat. No. 5,192,376 issued on Mar. 9, 1993 discloses a reinforcing pipe for car bodies, comprised of a steel alloy, for the making of which steel is rolled, and the steel blank is rolled to shape, in the hot-rolled condition, at a temperature of 600 degrees Celsius or greater. Subsequently, the pipe produced in this manner is subjected to a quench hardening so as to increase its strength.

In consideration of the reasons concerning crashes, it can be of advantage that in the case of the so-called B-columns of the passenger cell of a motor vehicle, when this comprises regions with varying material properties such as strength and with varying elongation properties. A customary embodiment for this is a B-column comprising a two-component pressed part composite, with a lower pressed component of soft steel and a high-strength upper pressed component, whereby the two pressed components are joined by known joining techniques. This approach leads to an increased productive effort and to a greater weight of the B-column. Furthermore, in the event of a crash, the zone of the joint at times provides the weak link.

Federal Republic of Germany Patent No. 197 43 802, issued on Sep. 14, 2000, corresponding to U.S. Pat. No. 5,972,134, issued on Oct. 26, 1999, discloses a method to achieve a plastic stiffness behavior which is non-uniform or differentiated in pressed form parts which comprise enhanced material by being treated in associated apparatus.

SUMMARY OF THE INVENTION

Based on this prior art, it is thus an object of the invention to provide a B-column for a motor vehicle which is improved with respect to its crash behavior, the production cost, as well as in terms of a reduction in weight.

The solution of this object, in accordance with the invention, is achieved in a B-column comprising a longitudinal steel profile which has a first longitudinal portion comprised of a substantially predominantly martensitic material structure and a strength of more than 1400 N/mm$^2$ and it, furthermore, comprises a second longitudinal portion with a greater ductivity or ductility and with a substantially predominantly ferritic-perlitic material structure and a strength of below 850 N/mm$^2$.

The embodiment of the material of construction of the B-column is a steel which can be hardened. Particularly, there is of advantage a steel alloy comprised of, in weight percent:

| | |
|---|---|
| Carbon (C) | 0.18% to 0.3% |
| Silicon (Si) | 0.1% to 0.7% |
| Manganese (Mn) | 1.0% to 2.50% |
| Chromium (Cr) | 0.1% to 0.8% |
| Molybdenum (Mo) | 0.1% to 0.5% |
| Titanium (Ti) | 0.02% to 0.05% |
| Boron (B) | 0.002% to 0.005% |
| Sulfur (S) | maximum 0.01% |
| Phosphorus (P) | maximum 0.025% |
| Aluminum (Al) | 0.01% to 0.06% | balance iron, and including incidental impurities due to smelting.

The B-column is manufactured in a warm form process, starting with a form blank or a pre-formed longitudinal profile which is subjected in a furnace to a treatment yielding an austenitic material structure and, subsequently, it is re-formed/hardened in a cooled tool or equipment. Large areas of the blank or, respectively, the pre-formed longitudinal profile can be isolated or protected in the furnace against temperature effects. Thus, these areas are not subjected to a significant heating, such that the temperature increase overall in these areas is markedly below the temperature causing an austenitic material structure. It follows that there can be achieved, in the cooled tool, an absence of martensitic materials structure with the high strength.

In the region of the foot of the B-column there is essentially then predominant the original ferritic-perlitic structure of the starting material—with excellent ductility (strength approximately 500 N/mm$^2$, an elongation of approximately 20%). In the remainder of the component structure, there is present a substantially predominantly martensitic material structure with a tensile strength Rm of greater than 1400 N/mm$^2$ It is also possible to first fully treat the longitudinal profile to attain an austenitic material structure and during transport into the hardening equipment, to bring the second longitudinal portion, that is, the subsequent foot of the column, by way of controlled, not too rough, cooling, for example, by blowing to a temperature markedly below the temperature which effects an austenitic material structure. The conditions such as, for example, residence time in the hardening equipment do then not produce a pure martensitic material structure, but a mixed structure with marked ferritic/bainitic components, which exhibits ductile properties.

A change from portions with high strength to ductile portions is possible with a plurality of frequencies.

The B-column in accordance with the invention exhibits an optimal crash behavior by the controlled pairing of strength and ductility. Furthermore, the invention reduces the number of components, as well as providing a reduction in weight, since additional joint zones between the otherwise separately produced structural components are dispensed with. Overall, this also yields a reduction in manufacturing cost.

In accordance with another feature of the present invention, the elongation at rupture A in the lower longitudinal portion is below 25%, preferably between 15% and 22%. Thus, the second longitudinal portion shows a markedly improved plastic stiffness behavior. The B-column is tuned in aimed manner to the requirements of a crash situation. In the first, upper, longitudinal portion it exhibits a high strength, whereas in the region of the second longitudinal portion (in the foot of the column) it exhibits high ductility.

In an advantageous embodiment of the present invention, the lower longitudinal portion is configured to be wider than the upper longitudinal portion. By way of this measure, as well as the feature that the longitudinal profile—preferably at the upper longitudinal portion—comprises a curved zone that is curved in spatial manner, the advantageous deformation characteristics of the longitudinal profile are enhanced in a crash event.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
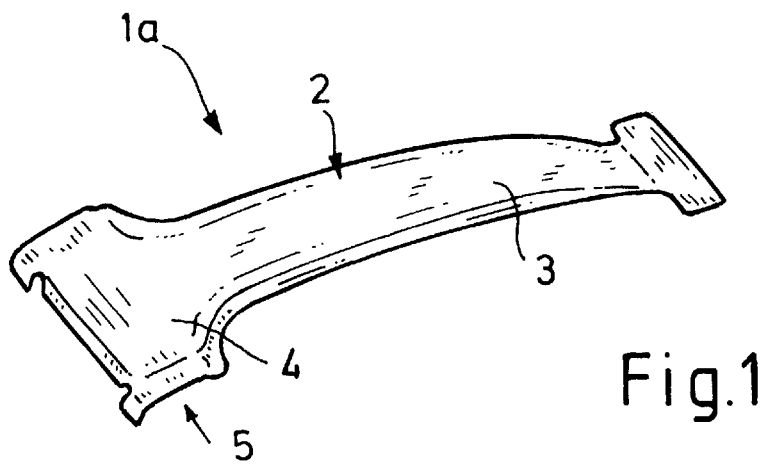
FIG. 1 is a perspective view of a B-column in accordance with one embodiment of the invention.
Figure 2:
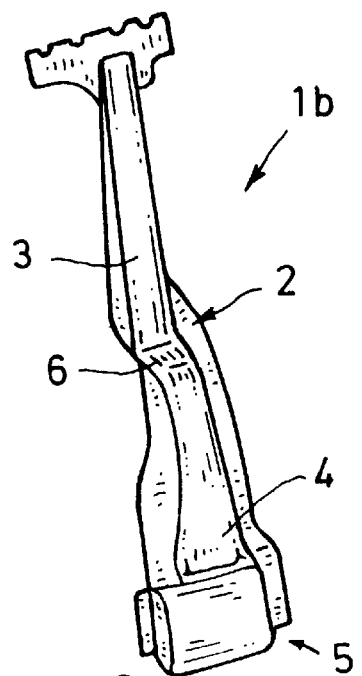
FIG. 2 is a perspective view of a further embodiment of a B-column in accordance with the present invention.

With reference to FIGS. 1 and 2, the reference numerals 1$a$ and 1$b$, respectively identify a B-column for a motor vehicle. The B-columns 1$a$, 1$b$ are respectively comprised of a longitudinal steel profile 2.

Such a longitudinal profile 2 comprises a first longitudinal portion 3 which has a substantially predominant martensitic material structure with a tensile strength Rm of more than about 1400 N/mm$^2$. The longitudinal profile 2 transitions into a second longitudinal portion 4 which subsequently provides the foot 5 of the column. In contrast with the first longitudinal portion 3, this portion has a much higher ductility and has a substantially predominantly ferritic-perlitic material structure and a strength of below about 850 N/mm$^2$. The elongation at rupture A for the lower longitudinal portion 4 is below about 25%, preferably at approximately 20%.

It can further be seen that the lower longitudinal portion 4 is wider than the upper longitudinal portion 3. As illustrated in FIG. 2, in the upper longitudinal portion 3 of the longitudinal profile 2, there is present a curved zone or section 6, curved in spatial manner.

Figure 3:
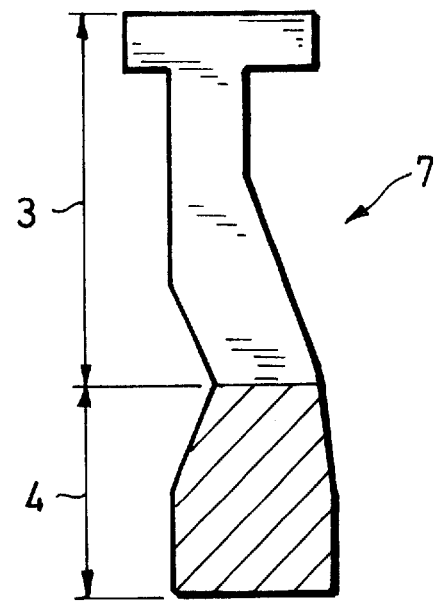
FIG. 3 is a schematic illustration of a form blank of a B-column.

The B-columns 1$a$, 1$b$ are made from a form blank 7 as illustrated schematically in FIG. 3. This has an outer contour which is in conformity with the production of the B-column 1$a$, 1$b$, with a first, upper, hardened longitudinal portion 3, and a second, lower, longitudinal portion 4 which has ductile material properties with strengths of about 500 N/mm$^2$ and an elongation to rupture of approximately 20%. The form blank 7 is shaped in a press tool to acquire the configuration of a B-column 1$a$ or, respectively, the shape of a B-column 1$b$.

Figure 4:
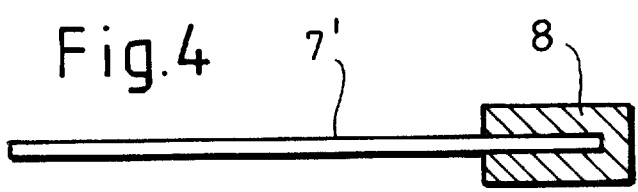
FIG. 4 is a simplified diagram of a side elevation of a blank for making a B-column with encapsulation of one end so at to be insulated against heat.

The B-columns 1$a$, 1$b$ are made of a steel alloy which can be hardened. For this, the form blank 7 or a pre-shaped profile is made austenitic in a furnace and is subsequently formed and hardened in a cooled equipment. In the furnace, the zone of the foot 5 of the column, which is to have ductile material properties in the subsequent component, is insulated with an insulation 8, so as to be protected against heat which might change the material structure. A blank 7' with an insulation 8 is shown in FIG. 4. The temperature increase in the portion protected by the insulation 8 is then markedly below the temperature at which an austenitic material structure is effected, such that substantially no martensitic material structure with the high strengths can occur in the cooled equipment. These regions form in the B-column 1$a$, and 1$b$ the second longitudinal portion with the foot 5 of the column, which substantially comprise the original ferritic-perlitic material structure of the starting material combined with an excellent ductility. The remainder of the component, due to its predominately martensitic material structure, has a strength of approximately 1500 N/mm$^2$.

While the invention has been illustrated and described as embodied in a B-column for motor vehicles, it is not intended to be limited to the details shown since various modifications and structural changes may be made without departing in any way from the spirit of the present invention.

What is claimed as new and desired to be protected by Letters Patent is set forth in the appended claims.

What is claimed is:

1. A B-column, as body component for a motor vehicle, comprising:
    a longitudinal steel profile which comprises:
        a first longitudinal portion, said first longitudinal portion comprising a substantially predominantly martensitic material structure and a strength of greater than about 1400 N/mm$^2$; and
        a second longitudinal portion comprising enhanced ductility and with a substantially predominantly ferritic-perlitic material structure and a strength of below about 850 N/mm$^2$, wherein the second longitudinal portion is disposed in prolongation of the first longitudinal portion.

2. The B-column of claim 1, wherein the elongation to rupture A of said second longitudinal portion is below about 25%.

3. The B-column of claim 2, wherein the elongation to rupture A of said second longitudinal portion is in the range of from about 15% to about 22%.

4. The B-column of claim 1, wherein said second longitudinal portion is wider than said first longitudinal portion.

5. The B-column of claim 1, wherein said longitudinal profile comprises a curved zone which is curved in spatial manner.

6. The B-column of claim 5, wherein said first longitudinal portion comprises said curved zone.

7. The B-column of claim 1, wherein said first longitudinal portion comprises the upper portion upon assembly in a motor vehicle.

* * * * *